(12) United States Patent
Kit

(10) Patent No.: US 9,489,277 B2
(45) Date of Patent: Nov. 8, 2016

(54) APPLICATION COMPONENT TESTING

(71) Applicant: Software Development Technologies, Walnut, CA (US)

(72) Inventor: Edward Francis Kit, Southlake, TX (US)

(73) Assignee: Software Development Technologies, Walnut, CA (US)

(*) Notice: Subject to any disclaimer, the term of this patent is extended or adjusted under 35 U.S.C. 154(b) by 463 days.

(21) Appl. No.: 14/074,074

(22) Filed: Nov. 7, 2013

(65) Prior Publication Data

US 2014/0129173 A1    May 8, 2014

Related U.S. Application Data

(60) Provisional application No. 61/723,702, filed on Nov. 7, 2012.

(51) Int. Cl.
  *G06F 11/263* (2006.01)
  *G06F 11/36* (2006.01)
  *G06F 11/34* (2006.01)

(52) U.S. Cl.
  CPC ......... *G06F 11/263* (2013.01); *G06F 11/3414* (2013.01); *G06F 11/3419* (2013.01); *G06F 11/3495* (2013.01); *G06F 11/3664* (2013.01); *G06F 11/3684* (2013.01); *G06F 11/3688* (2013.01)

(58) Field of Classification Search
  CPC .............. G06F 2201/875; G06F 11/3414; G06F 11/3419; G06F 11/3495; G06F 11/3684; G06F 11/3664; G06F 11/3688; G06F 11/263; Y10S 707/99934; Y10S 7/99933

USPC ........ 702/123; 717/168, 121, 124, 125, 126; 707/3, 999.003, 999.004, 999.202, 707/999.203, 769, E17.014; 714/38, 38.13, 714/E11.208, E11.217, E11.193; 715/227; 709/224; 718/100

See application file for complete search history.

(56) References Cited

U.S. PATENT DOCUMENTS

| | | | | |
|---|---|---|---|---|
| 6,002,869 A * | 12/1999 | Hinckley | ............ | G06F 11/3696 714/35 |
| 6,256,773 B1 * | 7/2001 | Bowman-Amuah | ..... | G06F 8/71 707/999.202 |
| 6,473,794 B1 * | 10/2002 | Guheen | .................. | H04L 41/22 709/223 |
| 6,934,934 B1 * | 8/2005 | Osborne, II | ........ | G06F 11/3414 709/224 |
| 6,993,748 B2 * | 1/2006 | Schaefer | ............ | G06F 11/3664 707/999.003 |
| 7,487,207 B2 * | 2/2009 | Smithline | ................. | G06F 8/31 709/203 |

(Continued)

*Primary Examiner* — Carol S Tsai
(74) *Attorney, Agent, or Firm* — DLA Piper LLP

(57) ABSTRACT

Systems and methods described here include embodiments for generating component test code for use in an application test generation program used to test an application under test. Certain embodiments include a computer server running the application test generation program with an integrated custom engine and function libraries, the custom engine configured to allow a user to define a component, allow the user to select at least one application area, allow the user to define a component step for the defined component, wherein defining a component step includes, an object repository associated with the selected application area, at least one object option associated with the selected object repository, wherein the selection of the object option determines subsequent sets of object options for selection by the user, repeating, and to generate the component test code, via associations in the function libraries between component test code portions and the defined component steps.

20 Claims, 9 Drawing Sheets

(56) References Cited

U.S. PATENT DOCUMENTS

2003/0084429 A1* 5/2003 Schaefer ............ G06F 11/3664
717/125

2011/0246511 A1* 10/2011 Smith ................ G06Q 30/0255
707/769
2014/0337105 A1* 11/2014 Platek .................... G06Q 10/08
705/7.35

* cited by examiner

| | Step Name | Module | Window | ObjectType | ObjectName | Operation | DefaultValue | Description |
|---|---|---|---|---|---|---|---|---|
| 1 | Step 1 | Login | LoginPage | WebEdit | UserName | EnterText | <<<UserName>>> | Enter the User name |
| 2 | Step 2 | Login | LoginPage | WebEdit | UserPassword | EnterText | <<<Password>>> | Enter the Password |
| 3 | Step 3 | Login | LoginPage | WebButton | Login | ClickObject | | Click the Login button |

FIG. 7

APPLICATION COMPONENT TESTING

CROSS REFERENCE TO RELATED APPLICATIONS

This application is related to and claims priority to and incorporates U.S. Provisional Application 61/723,702 filed 7 Nov. 2012.

FIELD

This application relates to the field of network computer application test automation using networked systems.

BACKGROUND

Manual application testing have shown to require excessive retesting for iterative modifications, among other things. Automation of certain aspects of testing can eliminate problems caused by manual testing.

SUMMARY

Systems and methods disclosed here include embodiments for generating component test code, for use in an application test generation program used to test an application under test. Certain embodiments include a computer server running the application test generation program with an integrated custom engine and function libraries, the custom engine configured to, allow a user to define a component. Certain embodiments also include allow the user to select at least one application area, from a set of application areas allow the user to define a component step for the defined component, wherein defining a component step includes, an object repository, selected by the user, from a set of object repositories associated with the selected application area, at least one object option, selected by the user, from a set of object options associated with the selected object repository, wherein the selection of the object option determines subsequent sets of object options for selection by the user. And some embodiments include upon completion of the definition of the component step, by the selections of object repositories and object options for the component step, allow the user to add and define further component steps by repetition of user selection of object repository and associated object options. And generate the component test code, via associations in the function libraries between component test code portions and the defined component steps, including the user selections of, object repositories and associated object options.

Some embodiments include where the object option includes at least one of, an operation and an attribute. Others include where the attribute is at least one of, a window, an object type, and an object name. And some, where a test case includes at least one component.

Embodiments may include where a test set includes at least one test case and some where the custom engine is further configured to send component test code for the test set to a test execution processor, for testing the application under test. In some embodiments, defining a component step further includes, a default value and a description, selected by the user. In some embodiments the operation is an action to be taken on the object.

In some embodiments here, systems and methods are disclosed for generating component test code, for use in an application test generation program used to test an application under test. Some embodiments include via a computer server running a custom engine and function libraries, integrated in the application test generation program, allowing a user to define a component, allowing the user to select at least one application area, from a set of application areas, allowing the user to define a component step for the defined component, wherein defining a component step includes, allowing the user to select an object repository from a set of object repositories associated with the selected application area, allowing the user to select at least one object option from a set of object options associated with the selected object repository, wherein the selection of the object option determines subsequent sets of object options for selection by the user, and allowing the user, upon completion of the definition of the component step by the selections of object repositories and object options for the component step, to add and define further component steps by repetition of user selection of object repository and associated object options, and generating the component test code, via associations in the function libraries between component test code portions and the defined component steps, including the user selections of, object repositories and associated object options.

Some embodiments of the systems and methods disclosed here have the object option include at least one of, an operation and attribute. And some embodiments include where the attribute is at least one of, a window, an object type, and an object name. Some embodiments include where a test case includes at least one component. Some have where a test set includes at least one test case. Certain embodiments further comprise sending component test code for the test set to a test execution processor, for testing the application under test. And in some embodiments, defining a component step further includes, allowing the user to define a default value and a description. Certain ones have where the operation is an action to be taken on the object.

Some embodiments disclosed here include a method and/or system for testing an application under test, comprising, via a computer server, in communication with a network, running an application test generation program, including a function library and a custom engine, creating component test code, via the custom engine, for use in an application test environment, wherein the creation includes, allowing a user to define a component, allowing the user to define a component step, for the defined component, wherein defining the component step includes, an object repository, selected by the user, from a presented set of object repositories, a first object option, selected by the user, from a presented set of object options associated with the selected object repository, a second object option, selected by the user, from a presented set of second object options, the second object options based upon the selection of the first selected object repository and the first selected object option, generate the component test code, based on the defined component step, via the custom engine, wherein the custom engine associates the defined component step with component code in the function library.

Some embodiments further comprise, via the computer server running the application test generation program, including the function library and the custom engine, creating component test code, for use in an application test environment, wherein the creation further includes, allowing the user to define further component steps by repetition of the user selection of object repository and associated object options. Certain embodiments include where the object option includes at least one of, an operation, a window, an object type, and an object name. And some include wherein the presented set of object repositories is associated with the selected application area.

BRIEF DESCRIPTION OF THE DRAWINGS

For a better understanding of the embodiments described in this application, reference should be made to the Detailed Description below, in conjunction with the following drawings in which like reference numerals refer to corresponding parts throughout the figures.

FIG. 7 is an example screenshot depicting design of example component steps consistent with certain embodiments herein.

DETAILED DESCRIPTION

Figure 1:
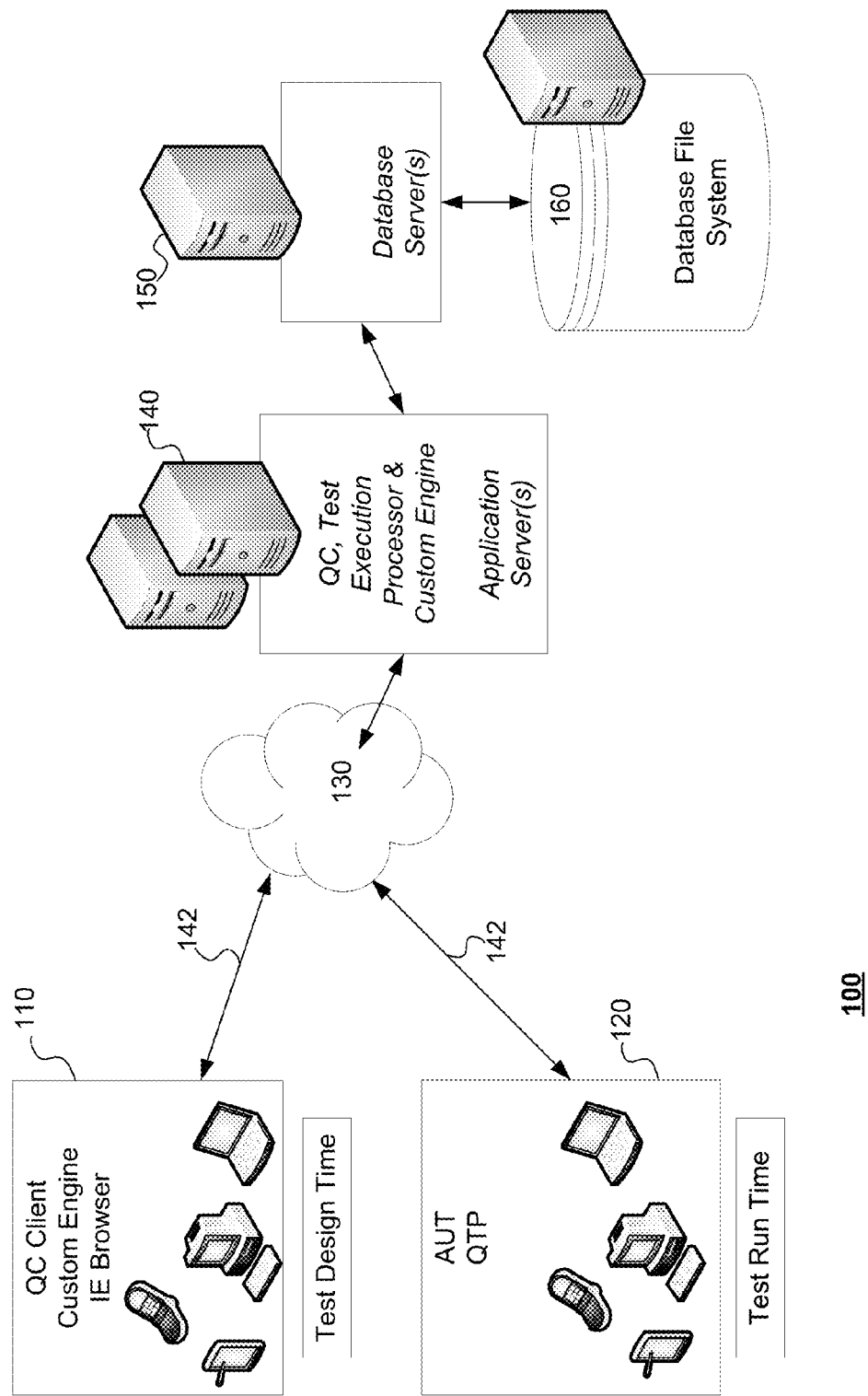
FIG. 1 is a network diagram depicting an example computer network flow to implement the innovations here consistent with certain embodiments herein.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

Introduction

Validation is the process of evaluating a system or component during or at the end of the development process to determine whether it satisfies specified requirements. Validation typically involves executing the actual software, though it may involve executing a simulated mockup. One of the purposes of function testing is to validate that the software product meets its functional requirements. Traditionally this testing process has been performed manually.

In an attempt to try to automate testing, capture/playback tools were used. These tools can record and replay user operations and allows development of function test software within an integrated development environment. This approach may work as follows: Capture/playback tools capture user operations, automatically creating a script. This script can automatically drive the application.

Capture/playback tools are usually viewed as function/regression test tools, which attempt to validate that applications work as expected. Thus, by capturing and playing back user interactions automatically, the tool can identify defects and ensure that applications work correctly initially and remain reliable. This is why they are called capture/playback tools and are sometimes referred to as record/playback, capture/replay, and record/replay.

Capture/playback tools capture user operations including keystrokes, mouse activity, and selected output. These captured tests, including tester-validated output, form a baseline for future regression testing of software changes. The tool can then play back the previously captured tests whenever needed, automatically driving the application and validating the results by comparing them to the previously saved baseline. This potentially frees the tester from manual testing. But repeatedly rerunning manual regression tests can be error-prone and ineffective.

Capture/playback tools have shown to be ineffective in relation to designing, documenting, and implementing practical test suites with the right subsets of test cases to have the highest probability of detecting errors. Further, they may be ineffective for how to cost-effectively architect an automated regression test library using the minimum number of highly technical, programming-proficient testers. And they also may be ineffective as to how to integrate the tasks of test design, automation, and test management. Additionally, because the scripts may be automatically produced, they may be non-structured, non-commented, mix test steps and data with test code, and are therefore difficult to maintain.

For instance, any iterations of the software applications require re-testing, and when the application to be tested changes, the associated previously captured test cases stop working. At this point, the tests are thrown away and the capture is performed again. The applications being tested can sometimes continue to change many times, necessitating recapturing, which is a manual test activity.

As testers abandoned the above described use of the capture/playback tool, tool users decided to leverage their knowledge of the capture/playback tool scripting language and attempted to use it to build structured, documented, robust tests. This scripting method often treated test automation as a software test-engineering project. The automated test suite would be built from scratch, and required writing well-designed, independent test scripts that included error detection and recovery logic.

Each test case would provide for its own setup, test actions, validation checking, and cleanup. The setup navigated the application to the state required to perform the test actions. The validation checking evaluated the results of the test actions and determined a Pass/Fail status. During cleanup, the test case returned to a known base state, ready for the next test.

However, there were issues with this approach as well. For example, since using it is an exercise in software test engineering, testers need to be highly technical, programming literate, and skilled software engineers. Often, existing testing staff are brought into the testing group because they are subject matter experts and can provide a customer focus during testing. While there may be a small number of technical test engineers, there are not enough available to make this approach work. And while this approach lends itself well to GUI testing, it's not easy to extend it to other forms of online, embedded, telecom, or batch systems. Also it does not effectively isolate test design from test script implementation. Test design is either ignored or stored in text documents without a link to the test script implementation. Often test cases still have the test data hard-coded into the test code. Finally, in this scripting approach every test is a test program. This means that if you have 10,000 tests, you also end up with 10,000 programs to run those 10,000 tests.

From the top down, from the testers' perspective, test cases may be designed at a high level of abstraction. They may be designed by a test designer in a self-documenting form appropriate for design articulation and reviewed by people who don't necessarily know the technical, implementation-level details.

For example, test design may be treated as a separate but integrated activity from test automation so one may assign skilled people to each activity. Test design requires knowledge of the application domain as well as test design techniques, but does not require programming literacy. The development side of test automation may require a very small number of developers—to date the solutions have not provided for this—until now. Additionally, designing tests on the fly during test implementation may cause problems. Also, solutions that are integrated with the leading test tool framework provided in the marketplace, may be beneficial.

The inventions disclosed here provide for novel solutions for generating test automation computer systems to interact with other computer software applications in the manner of a typical application user, among other things. The inventions here include systems and methods for implementing these ideas, including for example, user interfaces created within a role-based testing model, workflow code within the testing model context to support particular user interfaces, a library of technology object class action functions, and code for automated component code generation. Together, these can help reduce the effort and complexity of test design and computer software application test automation. Some examples of role based testing models may include the Hewlett Packard (HP) Application Lifecycle Management (ALM) Business Process Testing (BPT) Components module.

Overview

A custom engine may be a collection of utilities used to make the test automation activities for a Subject Matter Expert (SME) easier when working with applications under test (AUT). The custom engine may enable an SME to design and implement the test automation components and component test cases without any necessity of interacting with other programs and enables the SME to implement the components without having or using refined coding skills. This is beneficial, at least because the SME knows the subject matter of what is supposed to be tested, but may not have coding skills. By taking the coding requirement out of the test design and creation or minimizing it, the SME may be able to concentrate on the substance of the tests, and not be bogged down by the coding aspects. This also frees the engineer, who with other systems coded the test components, sometimes without detailed knowledge of the testing substance, to concentrate on the application area creation and object repository creation.

The tool set for component test case design and automation implementation may include several computer systems and software applications for testing other applications. One example would be an ALM tool, a server application with an additional module, for instance, a processing testing tool, that can enable users of the application lifecycle management client machines to create component test cases to create components and to initiate the execution of test cases. The separate but integrated test automation development environment application can enable users to implement each of the components. The component implementation can be a structured programming of the component procedure using the particular programming language. The application user can also directly or indirectly create an application area for storage of component building resources and can create a map, an object repository, of the AUT objects, for example a text box for username, the path within the AUT to find the object, and the attributes of each object that uniquely identify that object.

Some examples of a separate test automation tools may include but are not limited to, QuickTest Professional (QTP) from Hewlett Packard (HP), but this is exemplary only. An example language that QTP uses, is VBScript. Thus, continuing with the example only, the Automated Code Generation Implementation of Hewlett Packard Application Lifecycle Management (ALM) Business Process Testing (BPT) Components for Test automation of Computer Software Applications resides within the existing BPT model for HP—Application Lifecycle Management tool. Other such systems are contemplated, that work with other systems, as this embodiment is an example only.

These methods and systems apply to any other kind of similar testing environment and structure. Therefore, the references to HP, or any other example system is for explanatory purposes only and not intended to limit this disclosure to those embodiments alone.

Quality Center (QC) Architecture

FIG. 1 depicts an example network architecture that could be configured to implement the systems and methods disclosed here. For example, the machines that could run the QC client and the web browsers can be run on any kind of computing device 110. Depicted in FIG. 1 are a mobile device, a tablet computer, a laptop and a desktop. These could be any number of computing devices as long as they are able to communicate with a network or other computers. These machines could have graphical user interfaces, for user interface with the overall system, and are used in the test design time.

The machines that run the AUT and QTP could also be any kind of computing device as well 120. It should be noted that although the acronym QTP is used for Quick Test Professional, this is only one example of a functional and regression test automation system for software applications and environments. Any such system could be used, and QTP is used for example purposes only.

These are used in the test run time. The network then includes any kind of networking infrastructure to ensure that the personal devices can communicate with the system servers. Here, that is depicted as a wide area network, such as the internet 130 which allows for communication with the system servers 140. But any kind of networking infrastructure may be used, such as a local area network, wide area network, or any other kind of computing network. The network connections 142 could be a wireless such as a WiFi or cellular connection, or via a land line, etc. Any kind of network connection, either wide area, local area, etc. is usable as long as the communication path is able to be established among the computing devices.

The system servers 140 in this example case host the quality center, process testing and the custom engine. They may work as the application server or servers, for the system, in this example. These servers could be one or many servers as needed by the overall system. In turn, the servers are shown in communication with a database server, 150. Again, these database servers 150 could be one or many servers as needed. This example database server 150 is in communication with the storage database 160. The database 160 could be a local database or a networked data storage, including a decentralized and/or cloud-based data storage to allow for elastic storage. In that case, it may be in communication with a network such as the internet 130 as well.

BPT Methodology in Quality Center (ALM) Solution Architecture

Figure 2:
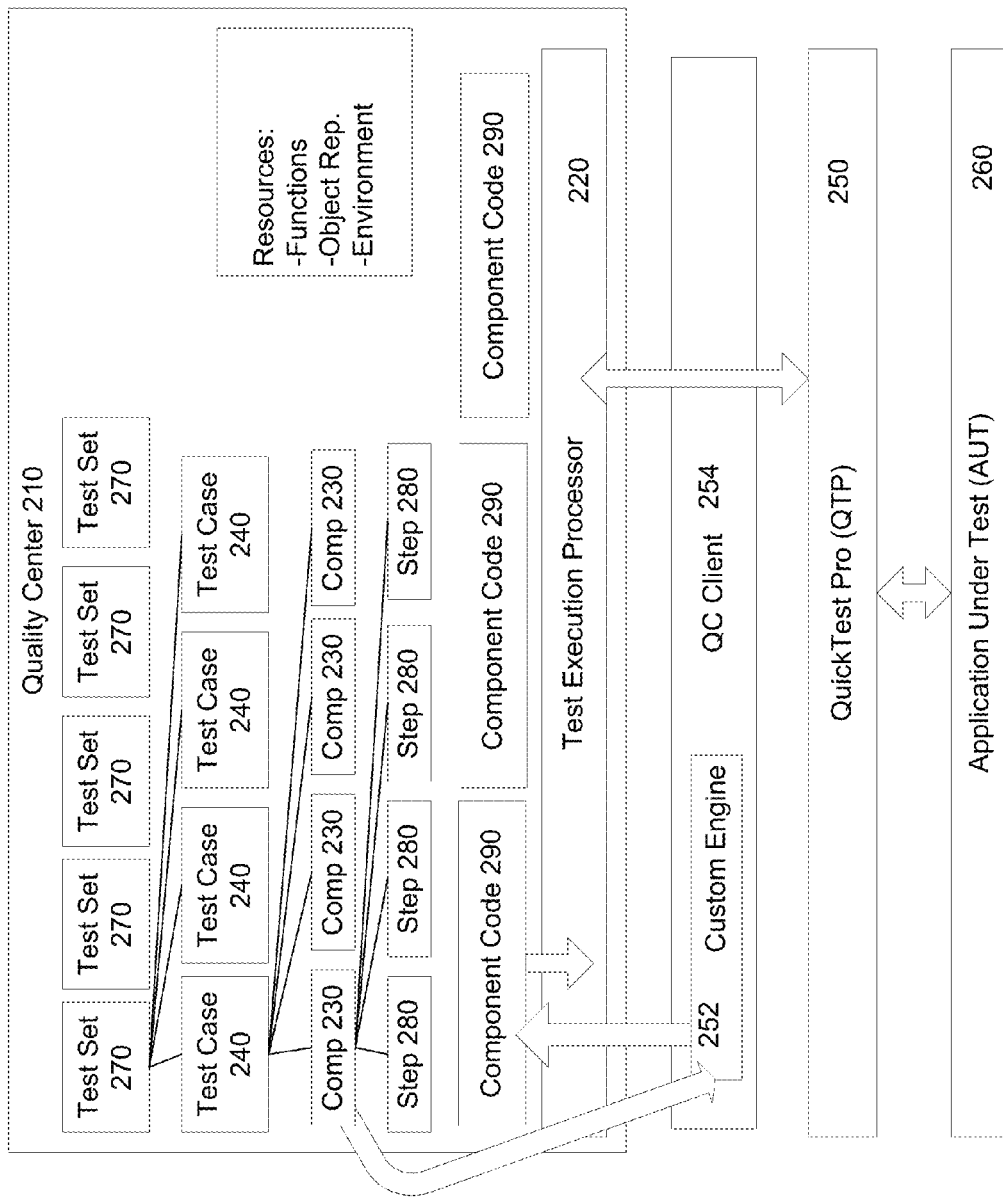
FIG. 2 is a flow diagram depicting an example process flow testing with the custom engine interaction consistent with certain embodiments herein.

FIG. 2 shows an example of how the flow of a test may be implemented using the inventive aspects of the disclosures here. In Quality Center 210, a SME is able to create components 230 and ultimately combine them into test sets 270 to be run through a test execution processor 220, which are used to check that the application under test, (AUT) behaves as expected.

For example, the tests to be used on the AUT 260, are shown in compartmentalized and modularized format in FIG. 2. Thus, test sets 270 are composed of test cases 240 which are composed of components 230 which are composed of steps 280. In this way, multiple test sets 270 can be designed and built using and re-using any of the building blocks of other tests. For instance, a component 230 that appears useful to a user may be re-used in another test, as it exists in its modularized form. Thus, for example, components 230 can be configured to be more easily-maintained reusable scripts that perform a specific task, and are the building blocks from which an effective process testing structure can be produced. Components 230 are parts of a system that has been broken down into smaller parts.

Thus, for example, when using the BPT Methodology in an example such as Quality Center (ALM) 210, each test set 270 that the SME creates is processed by the test execution processor 220. Within the test set, test case, component hierarchy, each component performs a specific task. A component 230 can pass data to a subsequent component. A component 230 is made up of a series of steps 280.

As an example, in some applications, users need to log in before they can do anything else. Thus, an SME can create one component 230 that represents the login procedure for an application. An example of what these steps 280 for a login procedure component 230 may appear as in an example test, may be, for example, a step that is something like "enter a username." Another may be "enter a password." Still another example step may be to "click on a button." These steps, in this example, make up the component called "Login." This Login component may be used over and over in different tests if it fits. It is compartmentalized, modularized, and packaged as a component that the SME knows and can implement over and over when the test calls for it.

Each component 230 can then be reused in different test cases 240, resulting in easier maintenance, updating, and test management. The manipulation of all of these modularized steps, components, test cases and test sets, are done by the SME, via a GUI that enables drag and drop style test building. The SME is not coding the individual steps or components, but manipulating them on a screen, and visually creating the tests.

And once those tests are all designed and built by the SME, the coding of the component 230 to create the component code 290 takes place, in order to run the code against the AUT 260 for the actual tests and test result gathering. But in this example, shown in FIG. 2, the coding is not done by the engineer, via the Quick Test Pro (QTP) 250. Previously an automation engineer had to create that code 290 in the development environment of QTP 290. But instead, in this example the engineer is not required to do this. Instead, the new QC Client 254 with custom engine 252 is used to code the test components 230 to generate that code 290. At the time of test execution the test execution processor 220 pushes the code 290 to the QTP 250 and ultimately drives the action of the AUT 260.

The custom engine 252 in FIG. 2 enables a SME to automate the tests without needing to know QTP and coding. This example solution reduces the role of the automation engineer, and enables the SME to carry out the test design and creation. The SME describes the attributes of the AUT objects to be manipulated and the actions to be taken with those objects. The custom engine 252 facilitates the process of the attributes and action description and the custom engine 252 programmatically implements the component code 290 from the component 230 design created by the SME. And again in this example, the automation engineer is only required for creation and maintenance of Application Areas and Object Repositories. The engineer is not required to code the test components, the custom engine 252 takes care of that, allowing the SME to concentrate on the substance of the test, and not the coding aspects.

One way, for example, that the custom engine 252, is able to facilitate design of the components 230, is because the process of adding the attributes and action description for the AUT objects in the steps 280 entails tens of value entries by the SME. The values in each step 280 are sequential and related for any given AUT object. The custom engine 252 dynamically generates lists of choices for each of the attributes. The list of choices generated for a given attribute is dependent on the choice made for the prior attribute. The custom engine uses the Open Test Architecture Application Programming Interface (OTA API), for example, to interact with Quality Center and Database.

It is because the attributes of each step used to create the components define the AUT objects and interaction with the objects, that the custom engine is able to generate the component code.

The custom engine can use the existing ALM, BPT, and QTP resources. No additional system hardware or client/server applications may be required. One example feature of the custom engine is that it can be built on top of an existing BPT model.

To facilitate the coding, the Component module 230 could include, but are not limited to the following:

Details: Provides a general summary of the component's purpose or goals, and the condition of the application before and after a component is run (its pre-conditions and post-conditions).

Snapshot: Displays an image that provides a visual cue or description of the component's purpose or operations.

Parameters: Specifies the input and output component parameter values for the component. Implementing and using parameters enables a component to receive data from an external source and to pass data to other components in the process test flow.

Design Steps: Enables users to create or view the manual steps of a component, and to automate it if required.

Automation: Displays or provides access to automated components. For keyword-driven components, enables users to create and modify the steps of an automated component in a keyword-driven, table format that could provide a plain-language textual description of each step of the implemented component.

Used by: Provides details about the tests that include the currently selected component. The tab also includes a link to the relevant process test in the Test Plan module.

An Example Model

Figure 3:
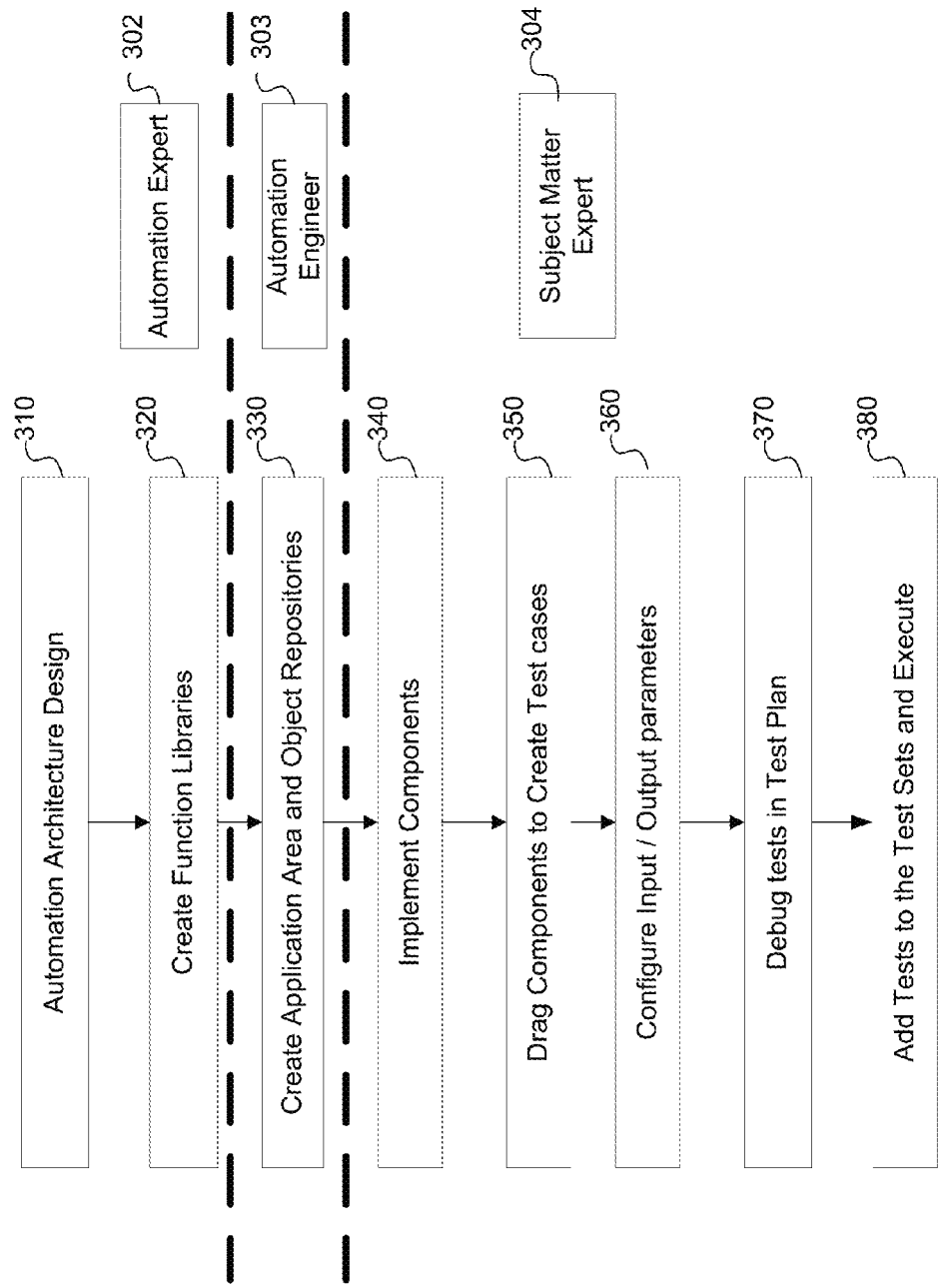
FIG. 3 is a flow diagram depicting example steps to create a test, based on automation expert and subject matter expert roles consistent with certain embodiments herein.

FIG. 3 is a flow chart that shows an example of how the test automation processes can be configured to create test cases for interaction and validation of the AUT. It also shows an example division of tasks, among automation expert 302, automation engineer 303, and SME 304, in relation to creating tests in certain embodiments.

For instance, in certain embodiments, the background or automation Architecture Design 310 of the system can be handled by the automation expert 302. This automation expert 302 would need to be able to code and know a particular computer language, in order to be able to set up this architecture, forming the foundation for the system. Thus, the automation expert can be essentially a person with software coding knowledge as well as architecture of test automation systems experience.

In some embodiment examples, the automation expert 302 can also be responsible for creating the function libraries 320. These libraries can be used as the basis for later component coding implementation. The function libraries may also include methods to manipulate objects that users interact with, on a class-of-object level. In this way, using classes, the libraries are able to be used to interact with object types wherever they are used within various AUTs. Each class-of-object method can be invoked for all objects of that type within the various AUTs.

Next, in certain embodiment examples as shown here, is the automation engineer 303. The automation engineer 303 may be responsible for creating application areas and object repositories 330. These objects may be manipulated or interacted with during the test. For example, a button may be an object. The object repository represents the structure of the AUT and uniquely defines each of the objects of the AUT. The object repository enables design and implementation of the components. This is all done, specifically for the AUT.

The final five steps in the example embodiment flow chart for FIG. 3 may all be accomplished by a SME 304. Thus, the final five steps do not require coding, and the SME can accomplish them without knowing computer code, or have to manipulate any of the existing computer code. Thus, the SME is basically a person without software knowledge, but skill in the design of software testing.

In this way, for example, the SME 304 is given the building blocks with which to design and build a test, block by block, without having to create or code the building blocks.

For example, the SME 304 may be able to use the application area and object repositories, created by the automation engineer 303, to implement the test components 340. In this way, the SME 304 can design components based on the objects already described In the object repository. The SME is able to drag selected components in the GUI of the test to be designed, to create actual test cases 350. The SME 304 may also choose to configure input/output parameters 360 for the test under design. The SME 304 may also debug test in the test plan 370. And finally, as shown in FIG. 3, the SME 304 may add the tests to the test sets and execute the tests 380.

This illustrative design model in FIG. 3, shows the example steps in a particular order, but the example order could be modified, depending on the particular circumstances of that design. The names and designated tasks for each member may also change as well.

Examples of Test Set-Ups

Figure 4:
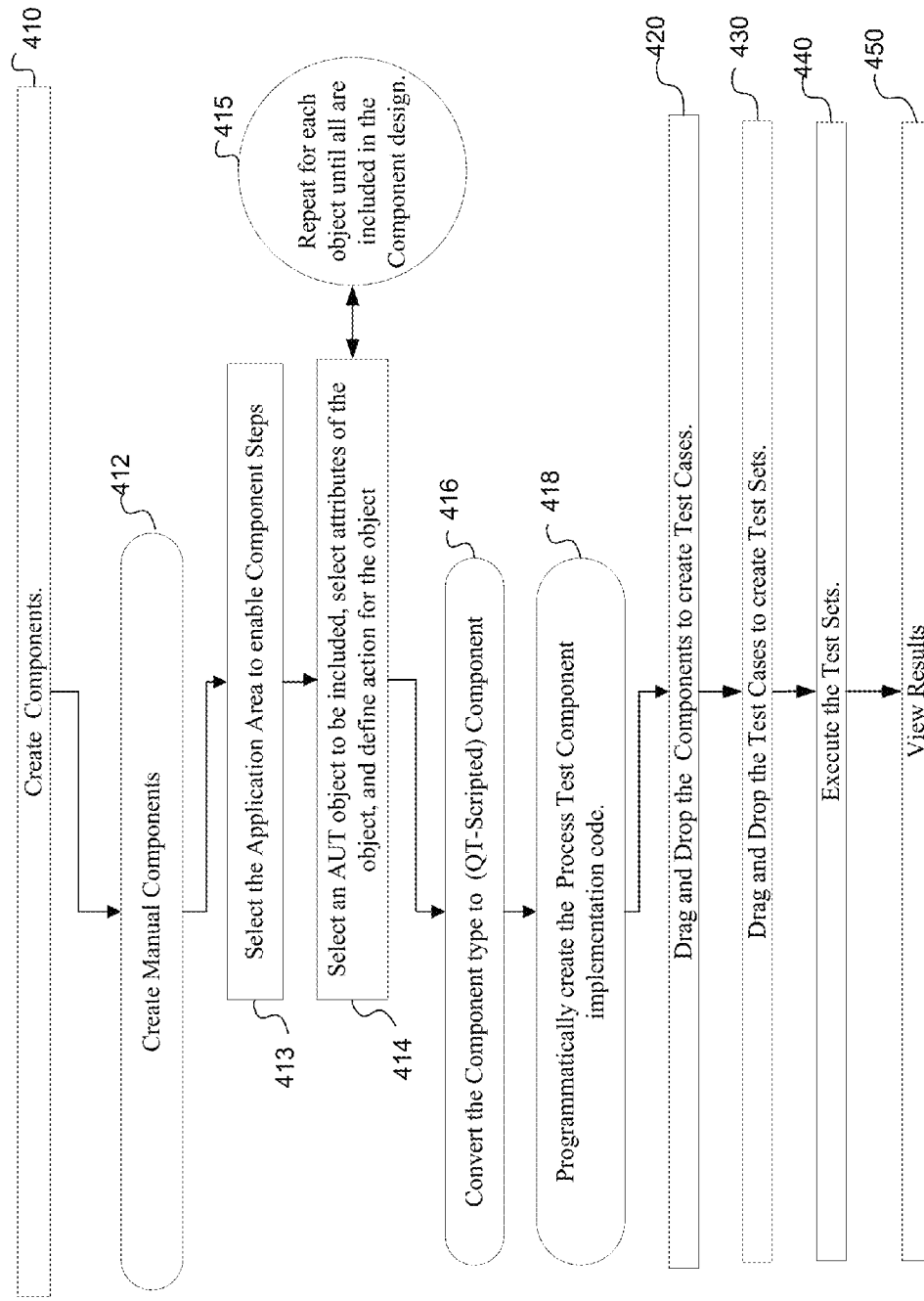
FIG. 4 is a flow diagram depicting example high-level process steps to create an automated component test case consistent with certain embodiments herein.

Referring to FIG. 4, which shows some example SME high-level process steps to create an automated Component Test Case. These are disclosed as an example only, not as a limiting embodiment in any way. For instance, a user may create components 410, drag and drop the components to create test cases 420, drag and drop the test cases to create test sets, 430, execute the test sets 440 and view results, 450.

Create components 410 may consist of, create manual components 412, convert the component type to (QT scripted) component, 416 and programmatically creating the process test component implementation code, 418. In certain embodiments, programmatically creating the process test component implementation code may be accomplished by pressing a custom solution menu button.

In some embodiments, creating manual components 412 may consist of selecting the application area to enable the window selection to enable object identification and to enable action selection, 414. Then start with the first AUT object to be included 413, selecting the attributes of the object and define the interaction with the object, and repeating for each object until all are included in the component design 415.

The following figures are example embodiment screen shots that are used to show example graphical user interface (GUI) examples that the system may have and the methods may use to interact with users.

In certain examples, the SME process steps to create an automated Component Test Case may be driven from the QC Client on a Personal Computer or similar device, whether mobile or not. FIG. 1 showed an example network architecture, but in this example, the QC client 110 is also used at test design time. The AUT/QTP 120 could be used at test run time.

Figure 5:
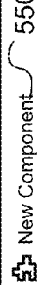
FIG. 5 is an example screenshot depicting creation of manual components consistent with certain embodiments herein.

FIG. 5 depicts an example GUI screenshot showing how a user may interact with certain embodiments of the system to create a manual component. It includes the following example steps:

Navigate to Component, a node in a tree of directories, and select New Component (not shown);

In the New Component window 550, name the Component field 540;

In the details tab 560, and the Application Area field, a custom dropdown shows a list of all the available Application Areas in the ALM 570;

Select the Application Area name 580; and

Complete the other fields in this form and select OK 590.

Figure 6:
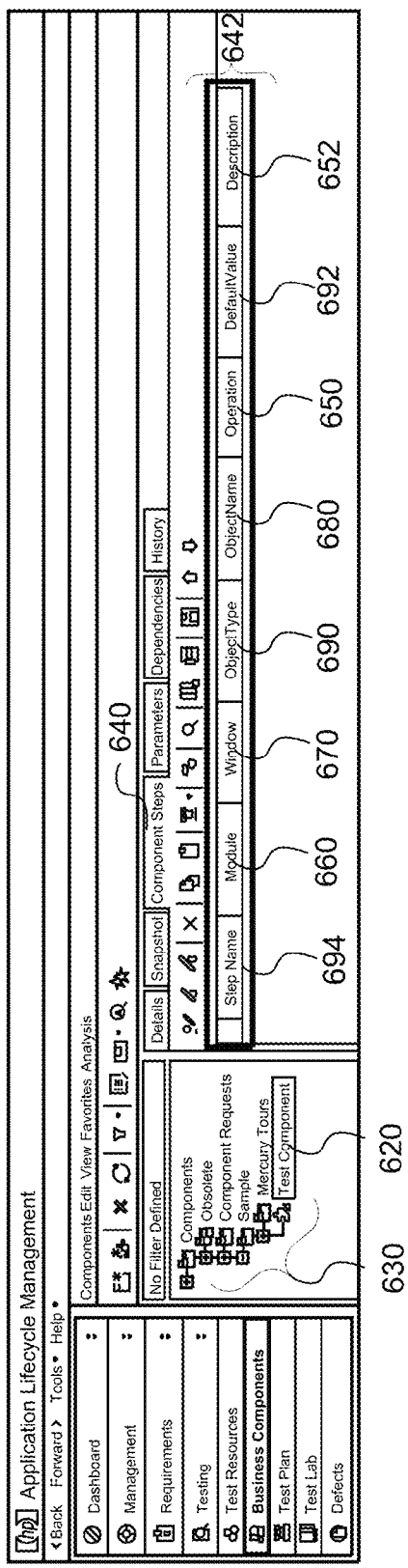
FIG. 6 is an example screenshot depicting selection of components consistent with certain embodiments herein.

FIG. 6 depicts a screenshot of an example GUI showing how users may interact with certain embodiments of the system to select the named component 620 within the tree of directories 630. In the Component Steps tab 640, all the custom fields will be available for designing the Component Steps, including any number of custom fields 642 which may include any of the following, among others: Operation 650, Module/Object Repository 660, Window 670, ObjectName 680, ObjectType 690, DefaultValue 692, Description 652 and Step Name 694.

FIG. 7 depicts a screenshot showing an example GUI allowing users to interact with certain embodiments of the system to select or add required parameters to the default value. Here, the Component Steps tab 740 is selected, and various of the above custom fields 742.

Figure 8:
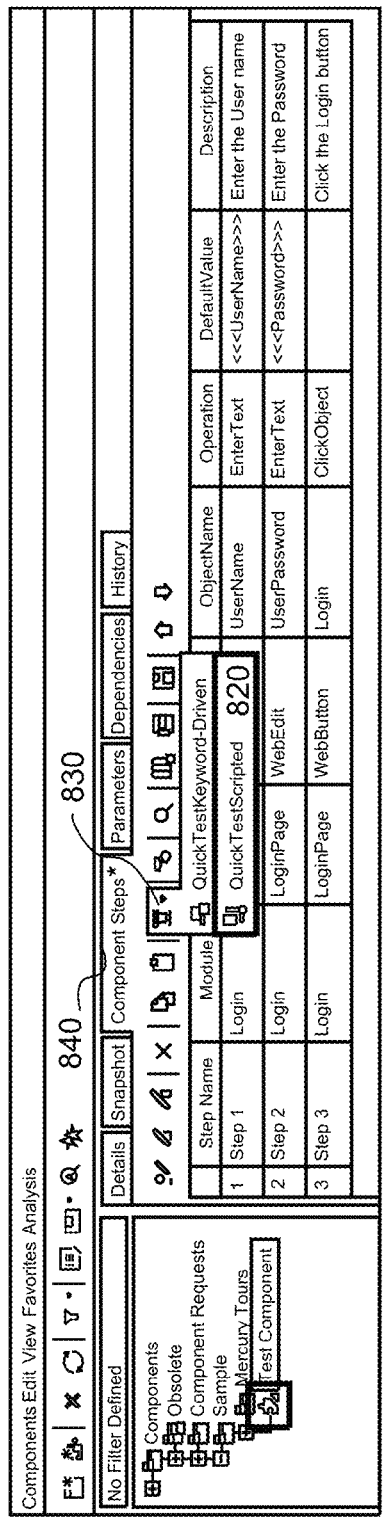
FIG. 8 is an example screenshot depicting QuickTest Scripted option consistent with certain embodiments herein.

FIG. 8 depicts a screenshot showing an example GUI showing how users may interact with certain embodiments of the system to design the other component steps in the component steps tab 840. After the Design steps are ready, for example, a user may convert the Manual Component to QuickTest Scripted Component by selecting the QuickTest Scripted option 820 from a particular menu icon, such as a generate script icon 830.

Figure 9:
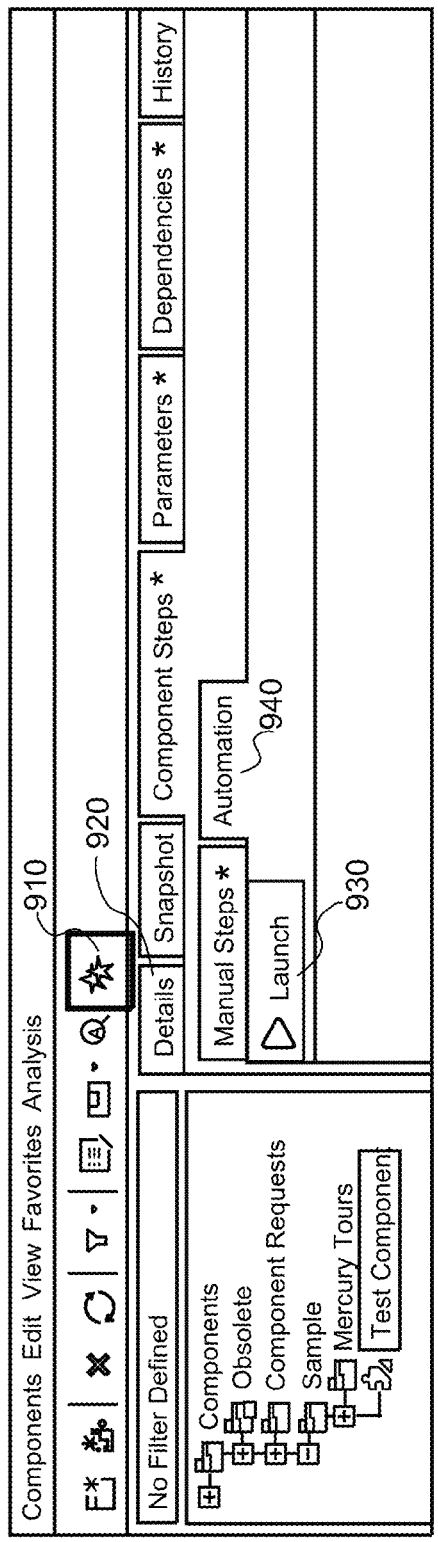
FIG. 9 is an example screenshot depicting convert steps that will parse all the manual steps to automated steps consistent with certain embodiments herein.

In certain example embodiments, the last action to perform is to click on the Convert Steps custom icon 910, as shown for example in the GUI screenshot in FIG. 9. This step tells the system to parse all the manual steps to automated steps. Similarly, a user could go to the Details tab 920 and change the Status of the Component to Ready state (not shown). Also, one may find that the component is ready to use in the Test Cases. And Component maintenance is also possible after the conversion by editing, updating, adding or deleting the design steps, a user could again, for example, click on the—Convert Steps custom icon 910 to update the automated steps. One could also click on the Launch icon 930 in the Automation tab 940 to begin an automation sequence.

CONCLUSION

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A system for generating component test code, for use in an application test generation program used to test an application under test, comprising:
   a computer server running the application test generation program with an integrated custom engine and function libraries;
   the custom engine configured to;
      allow a user to define a component;
      allow the user to select at least one application area, from a set of application areas;
      allow the user to define a component step for the defined component, wherein defining a component step includes;
         an object repository, selected by the user, from a set of object repositories associated with the selected application area;

at least one object option, selected by the user, from a set of object options associated with the selected object repository;
wherein the selection of the object option determines subsequent sets of object options for selection by the user;
upon completion of the definition of the component step, by the selections of object repositories and object options for the component step, allow the user to add and define further component steps by repetition of user selection of object repository and associated object options; and
generate the component test code, via associations in the function libraries between component test code portions and the defined component steps, including the user selections of, object repositories and associated object options.

2. The system of claim 1 wherein the object option includes at least one of, an operation and an attribute.

3. The system of claim 2 wherein the attribute is at least one of, a window, an object type, and an object name.

4. The system of claim 1 wherein a test case includes at least one component.

5. The system of claim 4 wherein a test set includes at least one test case.

6. The system of claim 5 wherein the custom engine is further configured to send component test code for the test set to a test execution processor, for testing the application under test.

7. The system of claim 2 wherein defining a component step further includes,
a default value and a description, selected by the user.

8. The system of claim 2 wherein the operation is an action to be taken on the object.

9. A method for generating component test code, for use in an application test generation program used to test an application under test, comprising:
via a computer server running a custom engine and function libraries, integrated in the application test generation program;
allowing a user to define a component;
allowing the user to select at least one application area, from a set of application areas;
allowing the user to define a component step for the defined component, wherein defining a component step includes;
allowing the user to select an object repository from a set of object repositories associated with the selected application area;
allowing the user to select at least one object option from a set of object options associated with the selected object repository;
wherein the selection of the object option determines subsequent sets of object options for selection by the user;
allowing the user, upon completion of the definition of the component step by the selections of object repositories and object options for the component step, to add and define further component steps by repetition of user selection of object repository and associated object options; and
generating the component test code, via associations in the function libraries between component test code portions and the defined component steps, including the user selections of, object repositories and associated object options.

10. The method of claim 9 wherein the object option includes at least one of, an operation and attribute.

11. The method of claim 10 wherein the attribute is at least one of, a window, an object type, and an object name.

12. The method of claim 9 wherein a test case includes at least one component.

13. The method of claim 12 wherein a test set includes at least one test case.

14. The method of claim 13, further comprising,
sending component test code for the test set to a test execution processor, for testing the application under test.

15. The method of claim 10 wherein defining a component step further includes,
allowing the user to define a default value and a description.

16. The method of claim 10 wherein the operation is an action to be taken on the object.

17. A method for testing an application under test, comprising:
via a computer server, in communication with a network, running an application test generation program, including a function library and a custom engine;
creating component test code, via the custom engine, for use in an application test environment, wherein the creation includes;
allowing a user to define a component;
allowing the user to define a component step, for the defined component, wherein defining the component step includes;
an object repository, selected by the user, from a presented set of object repositories;
a first object option, selected by the user, from a presented set of object options associated with the selected object repository;
a second object option, selected by the user, from a presented set of second object options, the second object options based upon the selection of the first selected object repository and the first selected object option;
generate the component test code, based on the defined component step, via the custom engine;
wherein the custom engine associates the defined component step with component code in the function library.

18. The method of claim 17, further comprising, via the computer server running the application test generation program, including the function library and the custom engine,
creating component test code, for use in an application test environment, wherein the creation further includes,
allowing the user to define further component steps by repetition of the user selection of object repository and associated object options.

19. The method of claim 17, wherein the object option includes at least one of, an operation, a window, an object type, and an object name.

20. The method of claim 19 wherein the presented set of object repositories is associated with the selected application area.

* * * * *